(12) United States Patent
Koeppel et al.

(10) Patent No.: US 12,197,982 B2
(45) Date of Patent: *Jan. 14, 2025

(54) CONFIGURING A SET OF APPLETS ON A BATTERY-LESS TRANSACTION CARD

(71) Applicant: Capital One Services, LLC, McLean, VA (US)

(72) Inventors: Adam Koeppel, Washington, DC (US); James Zarakas, Centreville, VA (US); Molly Johnson, Alexandria, VA (US); Tyler Locke, Jersey City, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,330

(22) Filed: Oct. 31, 2023

(65) Prior Publication Data
US 2024/0062031 A1    Feb. 22, 2024

Related U.S. Application Data

(63) Continuation of application No. 18/056,793, filed on Nov. 18, 2022, now Pat. No. 11,836,559, which is a
(Continued)

(51) Int. Cl.
*G06K 19/07*    (2006.01)
*G06K 19/04*    (2006.01)
(Continued)

(52) U.S. Cl.
CPC ....... *G06K 19/0707* (2013.01); *G06K 19/045* (2013.01); *G06Q 20/3278* (2013.01);
(Continued)

(58) Field of Classification Search
CPC .. G06K 19/0707; G06K 19/045; G06K 19/00; G06K 7/06; G06K 7/08;
(Continued)

(56) References Cited

U.S. PATENT DOCUMENTS 5,590,038 A    12/1996  Pitroda et al.
5,748,737 A    5/1998   Daggar et al.
(Continued)

FOREIGN PATENT DOCUMENTS

WO    2017127876 A1    8/2017

OTHER PUBLICATIONS

Dynamics Announcement from CES Dynamics Inc., Jan. 8, 2018, 6 pages. Retrieved from Internet: [URL:https://dynamicsinc.com/ces2018-announcement].
(Continued)

*Primary Examiner* — Edwyn Labaze
(74) *Attorney, Agent, or Firm* — Harrity & Harrity, LLP

(57) ABSTRACT

A transaction card may power on the transaction card using electric current induced from an interaction of the transaction card with an electromagnetic field. The transaction card may establish a communication with a device. The communication may indicate that the transaction card has powered. The transaction card may receive, from the device, a set of instructions to configure a set of applets on the transaction card after notifying the device that the transaction card has powered on. The set of applets to be configured may be related to completing one or more different transactions. The set of applets to be configured may be different than another set of applets already configured on the transaction card. The transaction card may configure the set of applets on the transaction card according to the set of instructions after receiving the set of instructions.

20 Claims, 6 Drawing Sheets

Related U.S. Application Data continuation of application No. 17/669,676, filed on Feb. 11, 2022, now Pat. No. 11,507,791, which is a continuation of application No. 17/248,431, filed on Jan. 25, 2021, now Pat. No. 11,270,176, which is a continuation of application No. 16/729,961, filed on Dec. 30, 2019, now Pat. No. 10,902,306, which is a continuation of application No. 16/512,955, filed on Jul. 16, 2019, now Pat. No. 10,521,709, which is a continuation of application No. 16/270,095, filed on Feb. 7, 2019, now Pat. No. 10,402,708, which is a continuation of application No. 16/027,979, filed on Jul. 5, 2018, now Pat. No. 10,248,897, which is a continuation of application No. 15/875,271, filed on Jan. 19, 2018, now Pat. No. 10,043,122.

(51) Int. Cl.
  *G06Q 20/32* (2012.01)
  *G06Q 20/34* (2012.01)
  *G06Q 20/36* (2012.01)
  *G06Q 40/02* (2023.01)

(52) U.S. Cl.
  CPC ....... *G06Q 20/352* (2013.01); *G06Q 20/3552* (2013.01); *G06Q 20/3563* (2013.01); *G06Q 20/3672* (2013.01); *G06Q 40/02* (2013.01)

(58) Field of Classification Search
  CPC .. G06K 19/06; G06Q 20/3278; G06Q 20/352; G06Q 20/3552; G06Q 20/3563; G06Q 20/3672; G06F 17/00
  USPC .......................... 235/375, 487, 441, 449, 493
  See application file for complete search history.

(56) References Cited

U.S. PATENT DOCUMENTS

| | | | |
|---|---|---|---|
| 6,573,880 B1 | 6/2003 | Simoni et al. |
| 6,609,653 B1 | 8/2003 | Lapstun et al. |
| 7,140,550 B2 | 11/2006 | Ramachandran et al. |
| 7,239,110 B2 | 7/2007 | Cheng et al. |
| 7,249,324 B2 | 7/2007 | Nakamura et al. |
| 7,525,283 B2 | 4/2009 | Cheng et al. |
| D651,237 S | 12/2011 | Mullen et al. |
| D651,238 S | 12/2011 | Mullen et al. |
| D651,644 S | 1/2012 | Mullen et al. |
| D652,075 S | 1/2012 | Mullen et al. |
| D652,076 S | 1/2012 | Mullen et al. |
| D652,448 S | 1/2012 | Mullen et al. |
| D652,449 S | 1/2012 | Mullen et al. |
| D652,450 S | 1/2012 | Mullen et al. |
| D652,867 S | 1/2012 | Mullen et al. |
| D653,063 S | 1/2012 | Post et al. |
| D653,288 S | 1/2012 | Mullen et al. |
| D665,022 S | 8/2012 | Mullen et al. |
| D665,447 S | 8/2012 | Mullen et al. |
| D666,241 S | 8/2012 | Mullen et al. |
| 8,260,199 B2 | 9/2012 | Kowalski et al. |
| D670,329 S | 11/2012 | Mullen et al. |
| D670,330 S | 11/2012 | Mullen et al. |
| D670,331 S | 11/2012 | Mullen et al. |
| D670,332 S | 11/2012 | Mullen et al. |
| D670,759 S | 11/2012 | Mullen et al. |
| D672,389 S | 12/2012 | Mullen et al. |
| D673,606 S | 1/2013 | Mullen et al. |
| D674,013 S | 1/2013 | Mullen et al. |
| D675,256 S | 1/2013 | Mullen et al. |
| 8,359,070 B1 | 1/2013 | Zhu |
| D676,487 S | 2/2013 | Mullen et al. |
| D676,904 S | 2/2013 | Mullen et al. |
| D687,094 S | 7/2013 | Mullen et al. |
| D687,095 S | 7/2013 | Mullen et al. |
| D687,487 S | 8/2013 | Mullen et al. |
| D687,488 S | 8/2013 | Mullen et al. |
| D687,489 S | 8/2013 | Mullen et al. |
| D687,490 S | 8/2013 | Mullen et al. |
| D687,887 S | 8/2013 | Mullen et al. |
| D688,744 S | 8/2013 | Mullen et al. |
| D692,053 S | 10/2013 | Mullen et al. |
| 10,043,122 B1 | 8/2018 | Koeppel et al. |
| 10,248,897 B1 | 4/2019 | Koeppel et al. |
| 10,402,708 B2 | 9/2019 | Koeppel et al. |
| 10,475,025 B2 | 11/2019 | Zarakas et al. |
| 10,521,709 B2 | 12/2019 | Koeppel et al. |
| 10,902,306 B2 | 1/2021 | Koeppel et al. |
| 11,270,176 B2 | 3/2022 | Koeppel et al. |
| 11,507,791 B2 | 11/2022 | Koeppel et al. |
| 2005/0188360 A1 | 8/2005 | de Jong |
| 2008/0314994 A1 | 12/2008 | Faith et al. |
| 2010/0030636 A1 | 2/2010 | Vijayshankar et al. |
| 2012/0021683 A1 | 1/2012 | Ma et al. |
| 2013/0086389 A1 | 4/2013 | Suwald et al. |
| 2013/0183936 A1 | 7/2013 | Smtih et al. |
| 2013/0339166 A1 | 12/2013 | Baer et al. |
| 2014/0081860 A1 | 3/2014 | Adrangi et al. |
| 2014/0236697 A1 | 8/2014 | Seo et al. |
| 2015/0058213 A1 | 2/2015 | Lee et al. |
| 2015/0287085 A1 | 10/2015 | Windmueller |
| 2015/0324766 A1 | 11/2015 | Park et al. |
| 2016/0063490 A1 | 3/2016 | Ziat et al. |
| 2016/0232517 A1 | 8/2016 | Gardiner et al. |
| 2016/0267486 A1 | 9/2016 | Mitra et al. |
| 2016/0358172 A1 | 12/2016 | Ziat et al. |
| 2017/0093585 A1 | 3/2017 | Lee et al. |
| 2017/0109620 A1 | 4/2017 | Wurmfeld et al. |
| 2017/0161709 A1 | 6/2017 | Tunnell et al. |
| 2018/0285856 A1 | 10/2018 | Choi et al. |
| 2019/0132730 A1 | 5/2019 | Leung |
| 2022/0327518 A1* | 10/2022 | Martin Perez ....... G06Q 20/352 |
| 2023/0078500 A1 | 3/2023 | Koeppel et al. |

OTHER PUBLICATIONS

Extended European Search Report for Application No. EP19152287.9, mailed on Apr. 25, 2019, 7 pages.

Wikipedia., "Applet," Dec. 1, 2017, 4 pages. Retrieved from Internet: [URL:https://en.wikipedia.org/wiki/Applet].

Wikipedia., "Electronic Paper,"Jan. 18, 2018, 10 pages. Retrieved from Internet: [URL:https://en.wikipedia.org/wiki/Electronic_paper].

Extended European Search Report for European Application No. EP24162283 dated May 13, 2024, 10 pages.

* cited by examiner

CONFIGURING A SET OF APPLETS ON A BATTERY-LESS TRANSACTION CARD

CROSS-REFERENCE TO RELATED APPLICATIONS

This application is a continuation of U.S. patent application Ser. No. 18/056,793, filed Nov. 18, 2022, entitled "CONFIGURING A SET OF APPLETS ON A BATTERY-LESS TRANSACTION CARD," which is a continuation of U.S. patent application Ser. No. 17/669,676, filed Feb. 11, 2022 (now U.S. Pat. No. 11,507,791), entitled "CONFIGURING A SET OF APPLETS ON A BATTERY-LESS TRANSACTION CARD," which is a continuation of U.S. patent application Ser. No. 17/248,431, filed Jan. 25, 2021 (now U.S. Pat. No. 11,270,176), entitled "CONFIGURING A SET OF APPLETS ON A BATTERY-LESS TRANSACTION CARD," which is a continuation of U.S. patent application Ser. No. 16/729,961, filed Dec. 30, 2019 (now U.S. Pat. No. 10,902,306), entitled "CONFIGURING A SET OF APPLETS ON A BATTERY-LESS TRANSACTION CARD," which a continuation of U.S. patent application Ser. No. 16/512,955, filed Jul. 16, 2019 (now U.S. Pat. No. 10,521,709), entitled "CONFIGURING A SET OF APPLETS ON A BATTERY-LESS TRANSACTION CARD," which is a continuation of U.S. patent application Ser. No. 16/270,095, filed Feb. 7, 2019 (now U.S. Pat. No. 10,402,708), entitled "CONFIGURING A SET OF APPLETS ON A BATTERY-LESS TRANSACTION CARD," which is a continuation of U.S. patent application Ser. No. 16/027,979, filed on Jul. 5, 2018 (now U.S. Pat. No. 10,248,897), entitled "CONFIGURING A SET OF APPLETS ON A BATTERY-LESS TRANSACTION CARD," which is a continuation of U.S. patent application Ser. No. 15/875,271, filed on Jan. 19, 2018 (now U.S. Pat. No. 10,043,122), entitled "CONFIGURING A SET OF APPLETS ON A BATTERY-LESS TRANSACTION CARD," all of which are hereby expressly incorporated by reference herein.

BACKGROUND

An applet may include a small application that performs a limited set of tasks. An applet may run within the scope of a dedicated engine or a larger program. For example, an applet may be a plug-in. In some cases, an applet may be designed to run on a web page.

Electronic paper (e.g., e-paper) may be a type of display device that mimics the appearance of ordinary ink on paper. Unlike backlit flat panel displays that emit light, electronic paper displays reflect light like paper.

SUMMARY

According to some possible implementations, a transaction card may comprise one or more memories, and one or more processors, communicatively coupled to the one or more memories, configured to power on the transaction card using electric current induced from an interaction of the transaction card with an electromagnetic field of a device. The one or more processors may be configured to establish a communication with the device or another device. The communication may indicate that the transaction card has powered on after powering on the transaction card. The one or more processors may be configured to receive, from the device or the other device, a set of instructions to configure a set of applets on the transaction card after notifying the device or the other device that the transaction card has powered on. The set of applets to be configured may be related to completing one or more different transactions. The set of applets to be configured may be different than another set of applets already configured on the transaction card. The one or more processors may be configured to configure the set of applets on the transaction card according to the set of instructions after receiving the set of instructions.

According to some possible implementations, a non-transitory computer-readable medium may store one or more instructions that, when executed by one or more processors, cause the one or more processors to power on a transaction card using electric current induced from interaction of a near-field communication (NFC) component of the transaction card with an electromagnetic field of a device. The one or more instructions, when executed by the one or more processors, may cause the one or more processors to provide a notification to the device or another device indicating that the transaction card has powered on after powering on the transaction card. The one or more instructions, when executed by the one or more processors, may cause the one or more processors to receive, from the device or the other device, a set of instructions to enable or disable a set of applets on the transaction card after notifying the device or the other device that the transaction card has powered on. The one or more instructions, when executed by the one or more processors, may cause the one or more processors to selectively enable or disable the set of applets on the transaction card according to the set of instructions after receiving the set of instructions.

According to some possible implementations, a method may comprise powering on, by a transaction card, the transaction card using electric current induced from an interaction of the transaction card with an electromagnetic field of a device. The method may comprise receiving, by the transaction card and from the device or another device, a set of instructions to configure a set of applets on the transaction card after powering on the transaction card using the electric current. An applet, in the set of applets, may be related to completing one or more types of transactions using the transaction card. The method may include determining, by the transaction card, whether any of the set of applets are already configured on the transaction card after receiving the set of instructions. The method may include configuring, by the transaction card, a subset of applets on the transaction card according to the set of instructions after determining whether any of the set of applets are already configured on the transaction card. The set of applets may include the subset of applets.

DETAILED DESCRIPTION

The following detailed description of example implementations refers to the accompanying drawings. The same reference numbers in different drawings may identify the same or similar elements.

A transaction card may have dimensional constraints (e.g., defined by standards, defined by components with which the transaction card is designed to interact, etc.). These dimensional constraints become particularly problematic as transaction cards are designed to be smarter and may limit the size and/or quantity of components that can be included in a transaction card. In addition, eliminating some components from inclusion in the transaction card may eliminate some potential functionality and/or uses of the transaction card. For example, two of the larger components that could be included in a transaction card are a display and a battery. Having both of these components in a transaction card is difficult given the dimensional constraints of the transaction card and/or may limit other components that can be included in the transaction card. In addition, excluding either of these components from a transaction card may limit potential functionality of the transaction card, such as functionality related to using the transaction card for different types of transactions.

Some implementations, described herein, provide a battery-less transaction card that can be reconfigured with different sets of applets for different types of transactions. In addition, in some implementations, the transaction card may include a display. In this way, some components of the transaction card can be excluded from the transaction card while minimizing loss of potential functionality of the transaction card. In addition, in this way, the transaction card can be more selectively powered for particular functions, relative to a battery that can supply steady power to the transaction card. This conserves dimensional resources of the transaction card that can be used for additional components, thereby improving functionality of the transaction card. In addition, this improves functionality of the transaction card by increasing a quantity and/or variety of the types of transactions for which the transaction card can be used, despite exclusion of a battery from the transaction card. Further, this improves power management of the transaction card via selective powering of the transaction card.

Figure 1A:
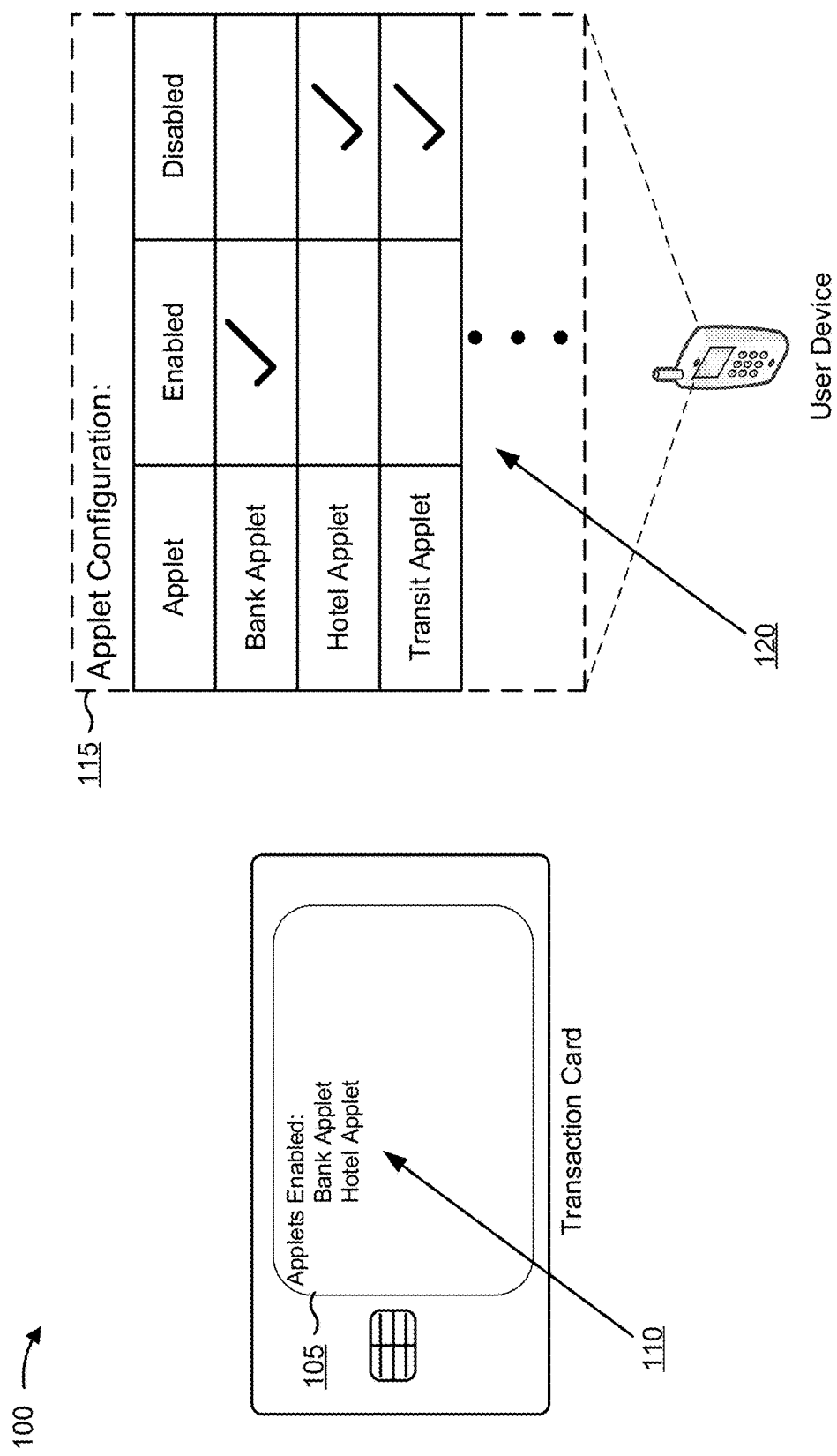
FIGS. 1A-1B are diagrams of an overview of an example implementation described herein.
Figure 1B:
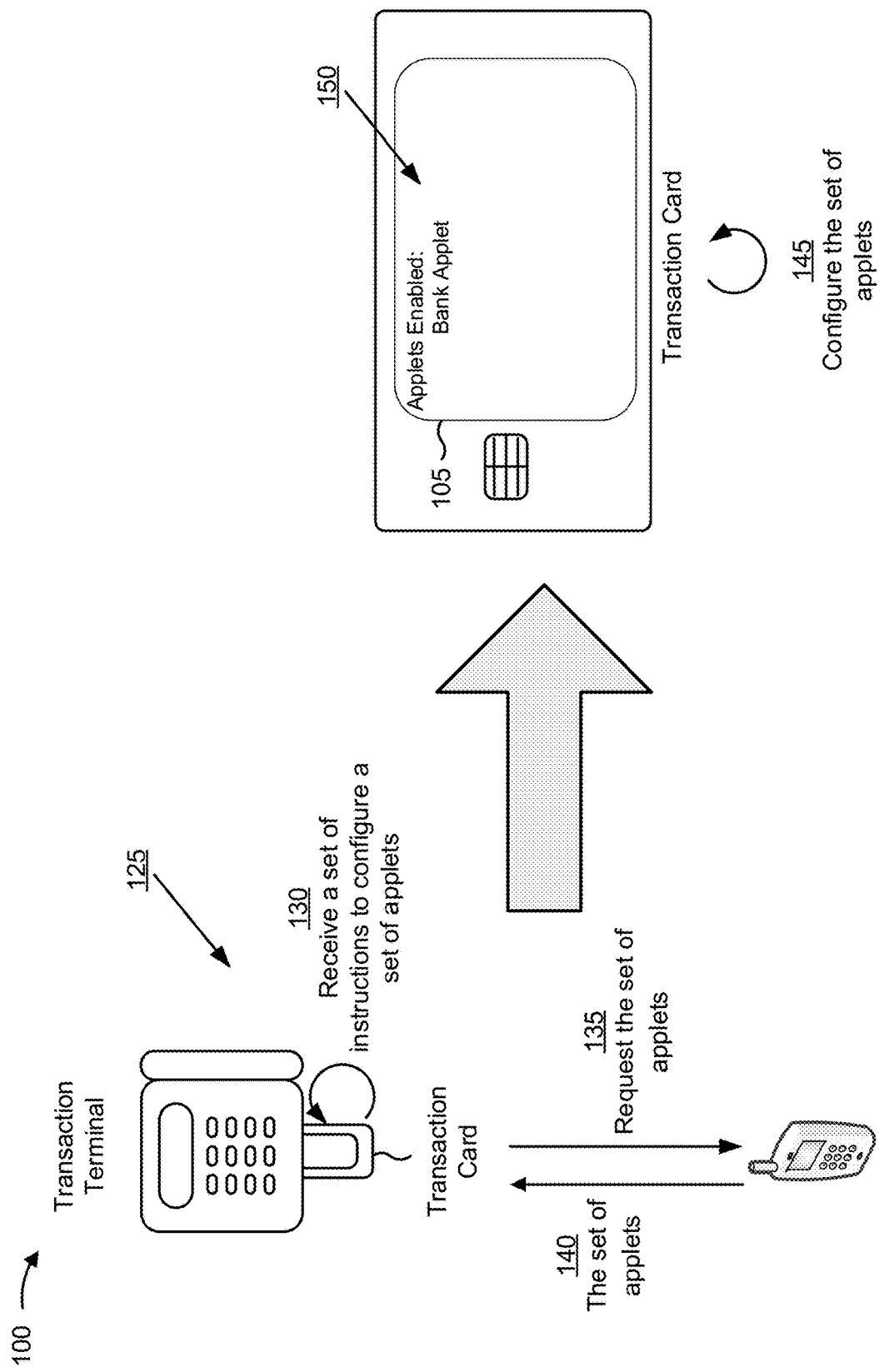

FIGS. 1A-1B are diagrams of an overview of an example implementation 100 described herein. As shown in FIG. 1A, implementation 100 includes a transaction card and a user device.

As shown in FIG. 1A, the transaction card may include an electronic paper display 105. While the transaction card may include other types of displays (e.g., backlit displays), use of electronic paper display 105 reduces or eliminates a need for the transaction card to include a battery or other internal power source to power the display of the transaction card. Rather, power is only needed to reconfigure electronic display 105. As shown by reference number 110, electronic paper display 105 may display information related to the transaction card. For example, electronic paper display 105 may display information that identifies a set of applets configured on the transaction card.

Each of the set of applets may be associated with a different account of an individual associated with the transaction card. For example, and as further shown by reference number 110, the transaction card may be configured with a bank applet related to using a bank account to complete a transaction and a hotel applet related to providing a user of the transaction card with access to a hotel room.

As shown by reference number 115, the user device may display a user interface related to modifying the set of applets configured on the transaction card. For example, the user of the user device may use the user interface to select a set of applets to be enabled on the transaction card and another set of applets to be disabled (or not configured) on the transaction card. The user interface, when loaded, may show a current configuration of applets enabled and disabled on the transaction card.

As shown by reference number 120, the user has selected a set of applets to be enabled on the transaction card and a set of applets to be disabled on the transaction card. For example, the user has not modified the configuration of the bank applet or the transit applet but has modified the hotel applet from being enabled on the transaction card to being disabled on the transaction card.

Because the transaction card does not include a battery, the configuration of applets on the transaction card may not be updated until the transaction card has power to power on and reconfigure. For example, the transaction card could be powered via power stored in a capacitive element of the transaction card and/or via interaction of a near-field communication (NFC) component of the transaction card with an electromagnetic field generated by another device. FIG. 1B, described below, shows one example of powering on the transaction card so that the configuration of applets on the transaction card can be updated.

As shown in FIG. 1B, and by reference number 125, the transaction card may be communicatively coupled to a transaction terminal. For example, the transaction card may have been inserted into a reader of the transaction terminal. When communicatively coupled to the transaction terminal, an NFC component of the transaction card may be brought within an electromagnetic field of the transaction terminal and electric current may be induced in the NFC component of the transaction card. The transaction card may power on using the electric current induced in the NFC component. The transaction card may provide, to the user device, information indicating that the transaction card has powered on.

In this way, the transaction card is selectively powered (e.g., when an NFC component of the transaction card is within an electromagnetic field of another device). This improves power management of the transaction card by reducing or eliminating a need for the transaction card to be continuously powered. In addition, this conserves power resources of the transaction card through more efficient and more selective use of power.

As shown by reference number 130, after powering on, the transaction card may receive, from the user device, a set of instructions to configure a set of applets (e.g., to enable some applets and/or disable other applets). The transaction card may enable or disable applets installed on the transaction card to configure the applets on the transaction card.

Alternatively, to conserve memory resources of the transaction card, the transaction card may selectively uninstall applets to be disabled and may install applets, not already installed on the transaction card, to enable applets. For example, and as shown by reference number 135, to enable a set of applets not previously configured on the transaction card, the transaction card may request the set of applets from the user device (e.g., to facilitate installation of the set of applets on the transaction card). As shown by reference number 140, and continuing with the previous example, the user device may provide the set of applets to be configured on the transaction card to the transaction card. For example, the user device may provide the set of applets not previously installed on the transaction card to the transaction card.

As shown by reference number 145, the transaction card may configure the set of applets. For example, the transaction card may enable some applets and disable other applets. Additionally, or alternatively, and as another example, the transaction card may install some applets and may uninstall other applets. The transaction card may, in association with configuring the set of applets, update electronic paper display 105 to display information identifying the set of applets configured on the transaction card. For example, and as shown by reference number 150, electronic paper display 105 may display information identifying the bank applet as being the only applet configured on the transaction card.

By configuring a set of applets when powered by another device, the transaction card does not need to be powered at all times and the transaction card can reduce or eliminate excess power consumption. This improves power management of the transaction card.

In this way, a transaction card may be reconfigured and used for different uses despite being a battery-less transaction card. In addition, in this way, the transaction card may be selectively powered to perform particular functions. This conserves power resources of the transaction card while minimizing a loss of potential functionality due to exclusion of a battery from the transaction card. In addition, a functionality of the transaction card is improved by including a display that is configured to display information when the transaction card is not powered. Further, this reduces or eliminates a need for the transaction card to be powered by an on-board power source, thereby improving functionality of the transaction card.

As indicated above, FIGS. 1A-1B are provided merely as an example. Other examples are possible and may differ from what was described with regard to FIGS. 1A-1B. For example, although the transaction card was described as having an electronic paper display, the transaction card may include other types of displays other than an electronic paper display.

Figure 2:
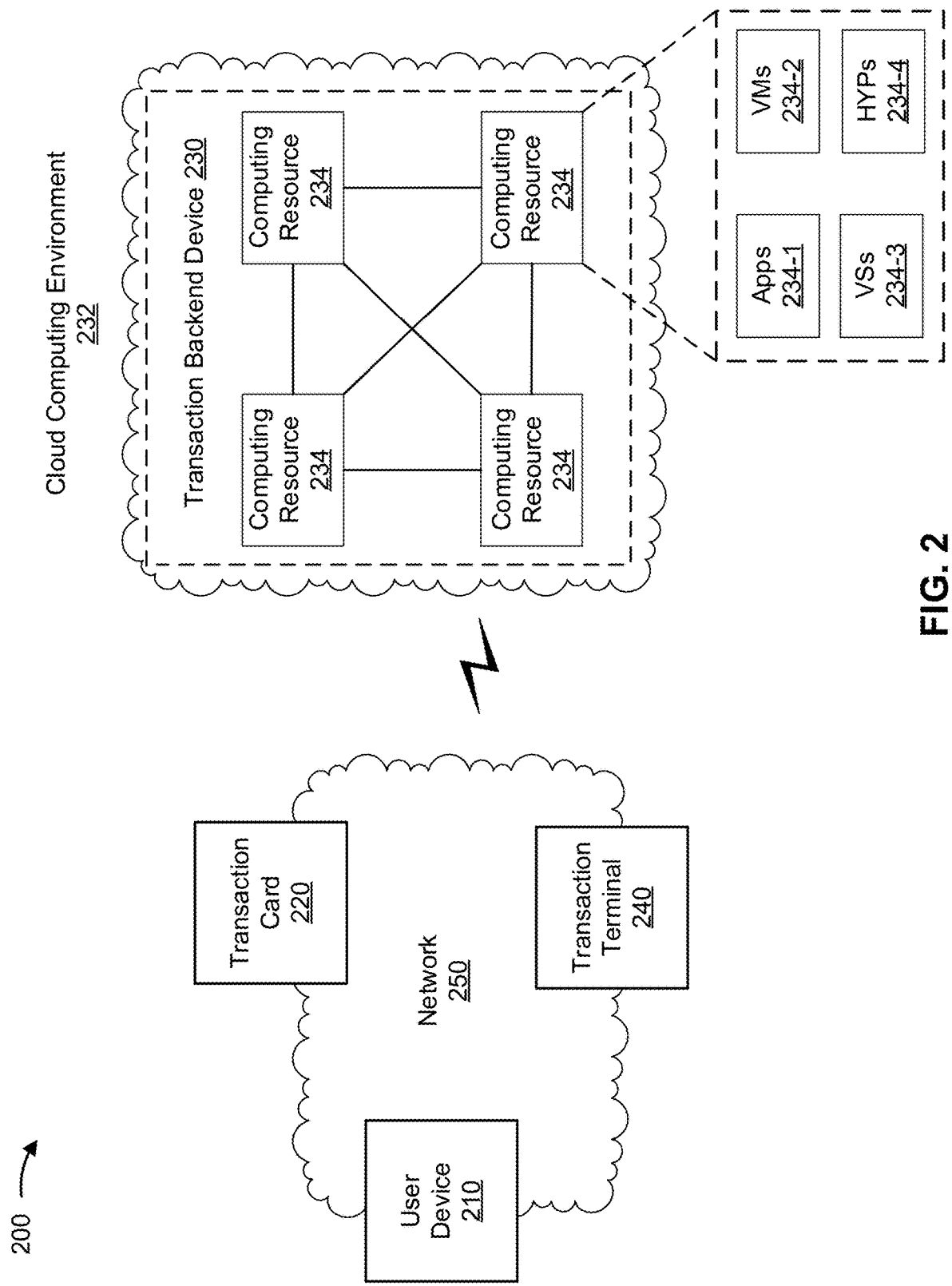
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a transaction card 220, a transaction backend device 230 within a cloud computing environment 232 that incudes computing resources 234, a transaction terminal 240, and a network 250. Devices of environment 200 may interconnect via wired connections, wireless connections, or a combination of wired and wireless connections.

User device 210 includes one or more devices capable of receiving, generating, storing, processing, and/or providing information associated with configuring a set of applets on transaction card 220. For example, user device 210 may include a desktop computer, a mobile phone (e.g., a smart phone, a radiotelephone, etc.), a laptop computer, a tablet computer, a handheld computer, a gaming device, a virtual reality device, a wearable communication device (e.g., a smart wristwatch, a pair of smart eyeglasses, etc.), or a similar type of device. In some implementations, user device 210 may provide, for display, a user interface can be used to select applets to be configured on transaction card 220, as described elsewhere herein. Additionally, or alternatively, user device 210 may provide, to transaction card 220, a set of instructions to configure a set of applets on transaction card 220, as described elsewhere herein.

Transaction card 220 includes a transaction card that can be used to complete a transaction. For example, transaction card 220 may include a credit card, a debit card, a gift card, a payment card, an automated teller machine (ATM) card, a stored-value card, a fleet card, a transit card, an access card, a virtual card implemented on user device 210, and/or the like. Transaction card 220 may be capable of storing and/or communicating data for a point-of-sale (PoS) transaction with transaction terminal 240. For example, transaction card 220 may store and/or communicate data, including account information (e.g., an account identifier, a cardholder identifier, etc.), expiration information of transaction card 220 (e.g., information identifying an expiration month and/or year of transaction card 220), banking information (e.g., a routing number of a bank, a bank identifier, etc.), transaction information (e.g., a payment token), and/or the like. For example, to store and/or communicate the data, transaction card 220 may include a magnetic strip and/or an integrated circuit (IC) chip (e.g., a EUROPAY®, MASTERCARD®, VISA® (EMV) chip). In some implementations, transaction card 220 may receive, from user device 210, a set of instructions to configure a set of applets on transaction card 220, as described elsewhere herein. Additionally, or alternatively, transaction card 220 may configure a set of applets on transaction card 220, as described elsewhere herein.

Transaction card 220 may include an antenna to communicate data associated with transaction card 220. The antenna may be a passive radio frequency (RF) antenna, an active RF antenna, and/or a battery-assisted RF antenna. In some implementations, transaction card 220 may be a smart transaction card, capable of communicating wirelessly (e.g., via Bluetooth, Bluetooth Low Energy (BLE), near-field communication (NFC), and/or the like) with a computing device, such as user device 210, a digital wallet, and/or another device. In some implementations, transaction card 220 may communicate with transaction terminal 240 to complete a transaction (e.g., based on being moved within communicative proximity of transaction terminal 240), as described elsewhere herein.

Transaction backend device 230 includes one or more devices capable of authorizing and/or facilitating a transaction. For example, transaction backend device 230 may include one or more servers and/or computers to store and/or provide information associated with processing a transaction via transaction terminal 240. In some implementations, transaction backend device 230 may process information from transaction card 220 to complete a transaction, as described elsewhere herein. Additionally, or alternatively, transaction backend device 230 may provide, to transaction card 220, a set of applets to be configured on transaction card 220, authorization to configure the set of applets, and/or the like, as described elsewhere herein.

Transaction backend device 230 may include one or more devices associated with a financial institution (e.g., a bank, a lender, a credit union, etc.) and/or a transaction card association that authorizes a transaction and/or facilitates a transfer of funds or payment between an account associated with a cardholder of transaction card 220 and an account of an individual or business associated with transaction terminal 240. For example, transaction backend device 230 may include one or more devices of one or more issuing banks associated with a cardholder of transaction card 220, one or more devices of one or more acquiring banks (or merchant banks) associated with transaction terminal 240, and/or one or more devices associated with one or more transaction card associations (e.g., VISA®, MASTERCARD®, and/or the like) associated with transaction card 220. Accordingly, based on receiving information associated with transaction card 220 from transaction terminal 240, devices of transaction backend device 230 (e.g., associated with a financial institution or transaction card association) may communicate to authorize a transaction and/or transfer funds between the accounts associated with transaction card 220 and/or transaction terminal 240.

Transaction backend device 230 may provide or deny authorization associated with a transaction. For example, transaction backend device 230 may store and/or provide information that may allow, or deny, access through an access point (e.g., a gate, a door, and/or the like) of a secure location (e.g., a room, a building, a geographical area, a transportation terminal, and/or the like) based on information (e.g., account information, a key, an identifier, credentials, and/or the like) associated with transaction card 220 and/or provided by transaction terminal 240.

Transaction backend device 230 may include one or more devices associated with a rewards program associated with transaction card 220 and/or an entity (e.g., a financial institution, a merchant, a service provider, a vendor, and/or the like) associated with transaction card 220 and/or transaction terminal 240. For example, transaction backend device 230 may authorize the earning and/or redemption of rewards (e.g., rewards points associated with transaction card 220, cash rewards, client loyalty rewards associated with an entity associated with transaction terminal 240, and/or the like) based on a transaction processed by transaction terminal 240.

In some implementations, as shown in FIG. 2, transaction backend device 230 may be hosted in cloud computing environment 232. Notably, while implementations described herein describe transaction backend device 230 as being hosted in cloud computing environment 232, in some implementations, transaction backend device 230 may not be cloud-based (i.e., may be implemented outside of a cloud computing environment) or may be partially cloud-based.

Cloud computing environment 232 includes an environment that hosts transaction backend device 230. Cloud computing environment 232 may provide computation, software, data access, storage, and/or other services that do not require end-user knowledge of a physical location and configuration of a system and/or a device that hosts transaction backend device 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host transaction backend device 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with transaction backend device 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Transaction terminal 240 includes one or more devices capable of facilitating processing of a transaction associated with transaction card 220. For example, transaction terminal 240 may include a point-of-sale (PoS) terminal, a payment terminal (e.g., a credit card terminal, a contactless payment terminal, a mobile credit card reader, a chip reader, etc.), a security access terminal, an automated teller machine (ATM) terminal, and/or the like. In some implementations, transaction terminal 240 may communicate with transaction backend device 230 to provide, to transaction backend device 230, information related to a transaction for which transaction card 220 is being used, as described elsewhere herein. In some implementations, transaction terminal 240 may generate an electromagnetic field that powers transaction card 220 when an NFC component of transaction card 220 is within the electromagnetic field, as described elsewhere herein.

In some implementations, transaction terminal 240 may include one or more input components and/or output components to facilitate obtaining information from transaction card 220 (e.g., an account number of an account associated with transaction card 220, an expiration date of transaction card 220, etc.), input (e.g., a personal identification number (PIN), a signature, biometric information, etc.), from a cardholder of transaction card 220, related to completing and/or authorizing a transaction, and/or the like. In some implementations, example input components of transaction terminal 240 may include a number keypad, a touchscreen, a magnetic strip reader, a chip reader, a pen and corresponding signature pad, an RF signal reader, and/or the like.

In some implementations, a magnetic strip reader of transaction terminal 240 may receive data from transaction card 220 as a magnetic strip of transaction card 220 is swiped along the magnetic strip reader. In some implementations, a chip reader of transaction terminal 240 may receive data from transaction card 220 via an integrated circuit chip (e.g., an EMV chip) of transaction card 220 when the chip is placed within communicative proximity of the chip reader. In some implementations, an RF signal reader of transaction terminal 240 may enable a contactless transaction from transaction card 220 and/or user device 210 by obtaining data wirelessly from transaction card 220 and/or user device 210 as transaction card 220 and/or user device 210 comes within communicative proximity of transaction terminal 240, such that the RF signal reader detects an RF signal from an RF antenna of transaction card 220 and/or user device 210.

In some implementations, example output components of transaction terminal 240 may include a display, a speaker, a printer, a light, and/or the like. In some implementations, transaction terminal 240 may use an output component to output information related to a transaction (e.g., an indication to cause a user to input information to authorize a transaction, information that identifies whether a transaction was completed, etc.).

Network 250 includes one or more wired and/or wireless networks. For example, network 250 may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
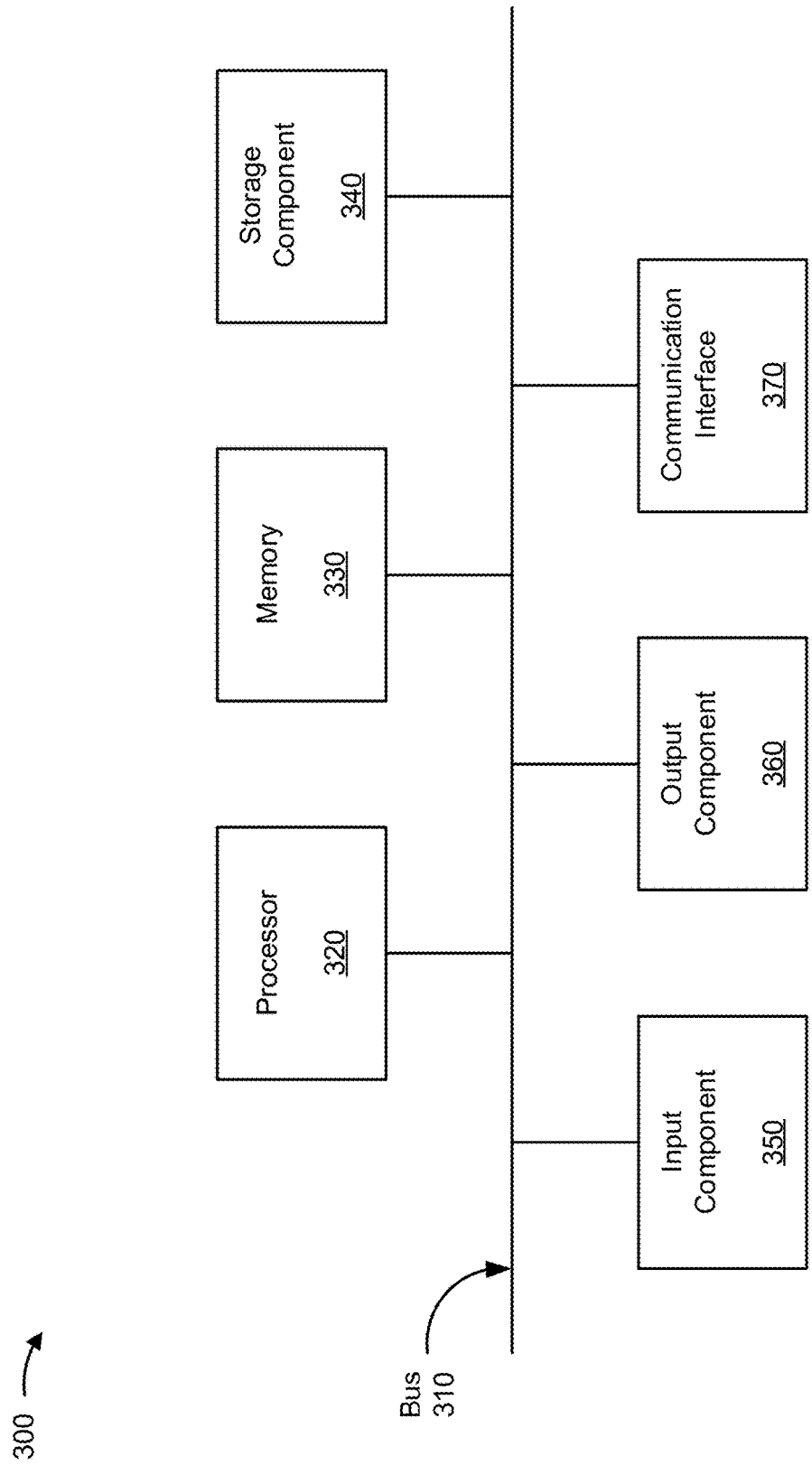
FIG. 3 is a diagram of example components of one or more devices of FIG. 2.

FIG. 3 is a diagram of example components of a device 300. Device 300 may correspond to user device 210, transaction card 220, transaction backend device 230, computing resource 234, and/or transaction terminal 240. In some implementations, user device 210, transaction card 220, transaction backend device 230, computing resource 234, and/or transaction terminal 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
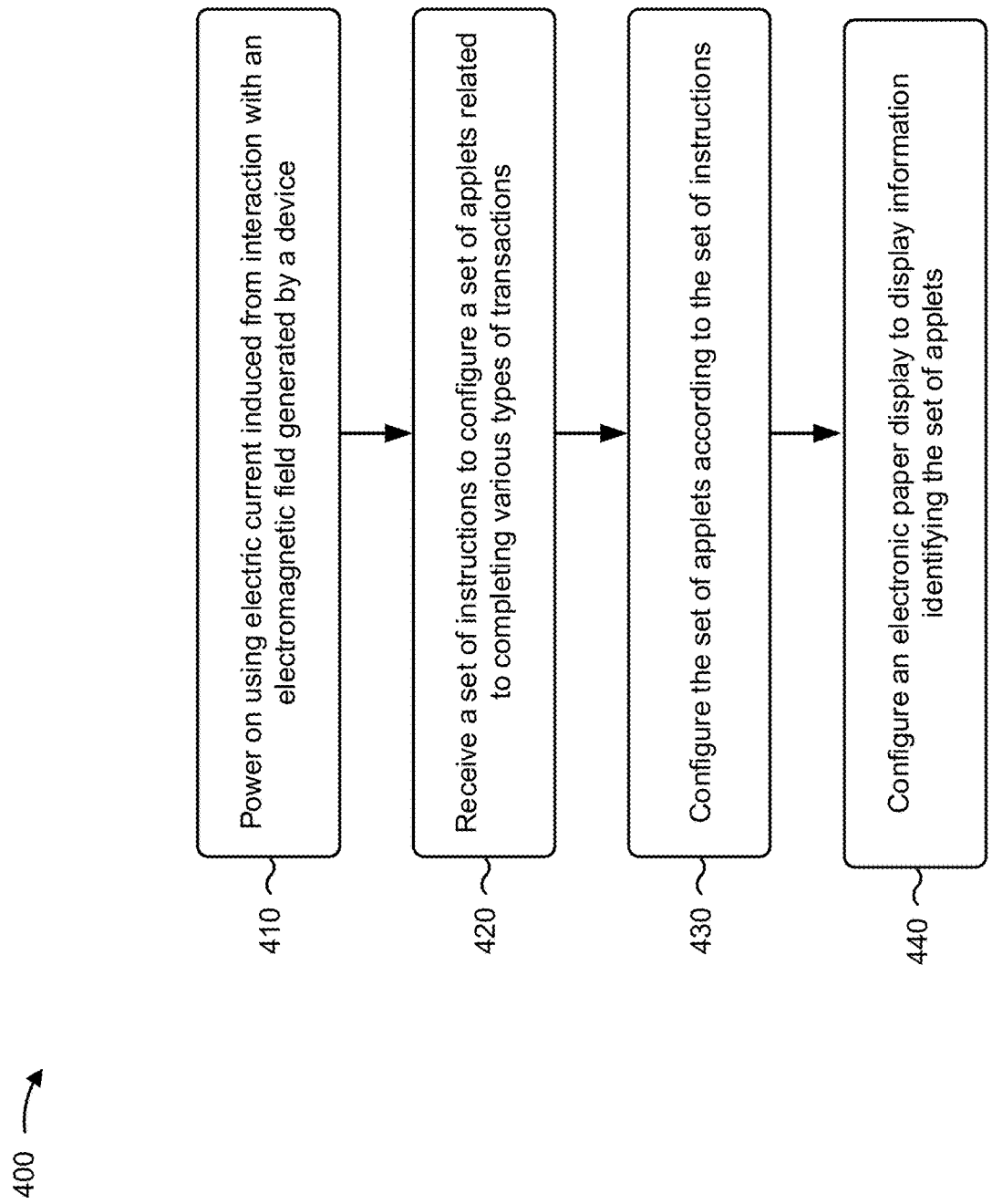
FIG. 4 is a flow chart of an example process for configuring a set of applets on a battery-less transaction card.

FIG. 4 is a flow chart of an example process 400 for configuring a set of applets on a battery-less transaction card. In some implementations, one or more process blocks of FIG. 4 may be performed by transaction card 220. In some implementations, one or more process blocks of FIG. 4 may be performed by another device or a group of devices separate from or including transaction card 220, such as user device 210, transaction backend device 230, computing resource 234, and transaction terminal 240.

As shown in FIG. 4, process 400 may include powering on using electric current induced from interaction with an electromagnetic field generated by a device (block 410). For example, transaction card 220 (e.g., using an NFC component) may power on using electric current induced from interaction with an electromagnetic field generated by a device. In some implementations, an electromagnetic field may be generated by user device 210, transaction terminal 240, a docking station for transaction card 220, a contactless charger, and/or the like.

In some implementations, transaction card 220 may include an NFC component. For example, the NFC component may include an NFC antenna. In some implementations, electric current may be induced in the NFC component when the NFC component is moved within an electromagnetic field generated by a device, such as user device 210 and/or transaction terminal 240. In some implementations, electric current induced in the NFC component may be used to power transaction card 220, to complete a transaction, to configure a set of applets on transaction card 220, and/or the like. In this way, by including an NFC component in which electric current can be induced, transaction card 220 may not need to include a battery. This provides additional space in transaction card 220 for other components, reduces a cost of transaction card 220, and/or the like.

In some implementations, transaction card 220 may store electric current induced in an NFC component of transaction card 220. For example, transaction card 220 may store the electric current in a capacitor or other capacitive element of transaction card 220, such as a solid state battery. The electric current stored in the capacitor can be used to power transaction card 220 when an NFC component of transaction card 220 is not within an electromagnetic field. This reduces or eliminates a need for electric current to be actively induced in the NFC component to power transaction card 220.

In some implementations, transaction card 220 may detect that an NFC component of transaction card 220 is within an electromagnetic field of a device and may power on using electric current induced in the NFC component. For example, electric current stored in a capacitor of transaction card 220 may power a processor of transaction card 220, which may monitor an amount of electric current induced in the NFC component of transaction card 220 and may power on transaction card 220 when the amount of electric current satisfies a threshold. Additionally, or alternatively, and as another example, a processor of transaction card 220 may power on when a first threshold amount of electric current has been induced in the NFC component of transaction card 220 and the processor may power on transaction card 220 when the amount of power satisfies a second threshold.

In some implementations, transaction card 220 may receive a set of instructions to power on (e.g., from user device 210). For example, transaction card 220 may receive a set of instructions to power on using electric current stored in a capacitor of transaction card 220, after providing a notification to user device 210 that a threshold amount of electric current has been induced in an NFC component of transaction card 220, and/or the like. In some implementations, transaction card 220 may power on after receiving a set of instructions to power on.

In some implementations, transaction card 220 may provide, for display, a notification indicating that transaction card 220 has powered on (e.g., after powering on). For example, transaction card 220 may provide a notification to user device 210, transaction terminal 240, transaction backend device 230, and/or the like. In some implementations, the notification may request, from a user of user device 210, approval to configure a set of applets on transaction card 220, which may cause an application installed on user device 210 to open (e.g., an application via which a user of user device 210 can select a set of applets to be configured on transaction card 220).

In this way, transaction card 220 selectively powers on to facilitate reconfiguration of transaction card 220. This reduces or eliminates a need for transaction card 220 to be powered at all times, thereby conserving power resources of transaction card 220, improving power management of transaction card 220, and/or the like. In addition, by inducing electric current from other devices, transaction card 220 can be selectively powered to perform particular functions. In addition, this reduces or eliminates a need for a battery in transaction card 220.

In this way, transaction card 220 may power on prior to receiving a set of instructions to configure a set of applets on transaction card 220.

As further shown in FIG. 4, process 400 may include receiving a set of instructions to configure a set of applets related to completing various types of transactions (block 420). For example, transaction card 220 (e.g., processor 320, communication interface 370, and/or the like) may receive a set of instructions to configure a set of applets related to completing various types of transactions. In some implementations, transaction card 220 may receive a set of instructions from user device 210, transaction terminal 240, transaction backend device 230 (e.g., via transaction terminal 240), and/or the like.

In some implementations, an applet may include a small or lightweight application designed to perform a limited set of functions. In some implementations, different applets may be associated with completing different types of transactions. For example, an applet may be associated with a bank account and may perform functions related to competing a transaction using the bank account. Additionally, or alternatively, and as another example, an applet may be associated with a hotel reservation and may perform functions related to granting a user of transaction card 220 access to a hotel room. Additionally, or alternatively, and as another example, an applet may be related to a transit account and may perform functions related to granting a user of transaction card 220 access to a transit system.

In some implementations, the set of instructions may identify one or more applets, or a set of applets, to be enabled or disabled on transaction card 220, to be installed or uninstalled on transaction card 220, and/or the like. In some implementations, a set of applets to be configured on transaction card 220 may be different than a set of applets already configured on transaction card 220 (e.g., some of the applets to be configured on transaction card 220 may be different than some of the applets already configured on transaction card 220).

In some implementations, the set of instructions may identify modifications to applets already configured on transaction card 220 (e.g., rather than identifying a manner in which all possible applets are to be configured). For example, the set of instructions may identify that an applet already enabled is to be disabled and may not identify applets that are to remain enabled or disabled. This reduces an amount of data provided to transaction card 220, thereby conserving processing resources of transaction card 220 and/or the device that provided the set of instructions. In addition, this conserves network resources between transaction card 220 and the device that provided the set of instructions. Further, this reduces an amount of time needed to configure a set of applets on transaction card 220 by reducing or eliminating an amount of data that transaction card 220 has to process to identify a manner in which a set of applets is to be configured.

In some implementations, transaction card 220 may receive a set of instructions periodically, according to a schedule, and/or the like. Additionally, or alternatively, transaction card 220 may receive a set of instructions each time transaction card 220 powers on and there has been a modification to the set of applets to be configured on transaction card 220. For example, when transaction card 220 powers on, transaction card 220 may request, from user device 210 and/or transaction backend device 230, an update to the configuration of transaction card 220.

In some implementations, transaction card 220 may receive the set of instructions after a user of user device 210 has identified a set of applets to be configured on transaction card 220. For example, the user of user device 210 may select a set of applets to be configured on user device 210 via a user interface of an application installed on user device 210. In some implementations, user device 210 may provide the set of instructions to transaction card 220 after the user has selected the set of applets to be configured. For example, user device 210 may provide the set of instructions to transaction card 220 via a wireless connection between transaction card 220 and user device 210. Additionally, or alternatively, and as another example, user device 210 may provide the set of instructions to transaction backend device 230 or a server device for storage so that the transaction backend device 230 or the server device can provide the set of instruction to transaction card 220 the next time transaction card 220 powers on and/or requests a configuration update.

In this way, transaction card 220 may receive a set of instructions to configure a set of applets prior to configuring the set of applets.

As further shown in FIG. 4, process 400 may include configuring the set of applets according to the set of instructions (block 430). For example, transaction card 220 (e.g., processor 320) may configure the set of applets according to the set of instructions.

In some implementations, transaction card 220 may selectively enable or disable the set of applets. For example, transaction card 220 may determine whether one or more of the set of applets are enabled or disabled on transaction card 220 and may enable applets to be configured on transaction card 220 that are not already enabled and may disable applets that are enabled on transaction card 220 but are no longer to be configured on transaction card 220. In some implementations, transaction card 220 may enable one or more of the set of applets on transaction card 220. For example, transaction card 220 may not need to enable applets already enabled on transaction card 220, thereby conserving processing resources of transaction card 220. Additionally, or alternatively, transaction card 220 may disable one or more of the set of applets already configured on transaction card 220. For example, transaction card 220 may not need to disable applets already disabled on transaction card 220, thereby conserving processing resources of transaction card 220.

In some implementations, transaction card 220 may install and/or uninstall applets to configure the set of applets on transaction card 220. For example, transaction card 220 may install, on transaction card 220, one or more of the set of applets that are not already installed on transaction card 220. Additionally, or alternatively, and continuing with the previous example, transaction card 220 may uninstall (e.g., remove) one or more of the set of applets installed on transaction card 220 that are not included in the set of applets to be configured on transaction card 220.

In some implementations, transaction card 220 may determine whether applets already configured on transaction card 220 include the set of applets to be configured on transaction card 220 (e.g., whether any of the set of applets are already configured on transaction card 220). For example, prior to configuring the set of applets, transaction card 220 may determine which of the set of applets need to be enabled on transaction card 220 and which of the applets already enabled on transaction card 220 need to be disabled. In some implementations, transaction card 220 may selectively configure the set of applets on transaction card 220 based on which applets need to be configured on transaction card 220 and which need to be removed from transaction card 220. This conserves processing resources of transaction card 220 by reducing a quantity of applets that transaction card 220 needs to configure.

In some implementations, transaction card 220 may request, from user device 210 and/or transaction backend device 230, an applet to be configured on transaction card 220. For example, transaction card 220 may have limited memory resources and may not be capable of storing all possible applets that could be configured on transaction card 220. In this case, if an applet to be configured on transaction card 220 is not already on transaction card 220, then transaction card 220 may request the applet. For example, transaction card 220 may request program files, program code, installation files, and/or the like to store and/or install on transaction card 220. This conserves memory resources of transaction card 220.

In some implementations, transaction card 220 may determine a set of applets to be configured on transaction card 220. For example, transaction card 220 may detect a location of transaction card 220 based on location information received from transaction terminal 240 and/or user device 210 (e.g., a geographic location of a transaction terminal 240 and/or user device 210 with which transaction card 220 is communicatively coupled) and may identify a set of applets to be configured based on the location of transaction card 220. Additionally, or alternatively, and as another example, transaction card 220 may detect a user associated with transaction card 220 (e.g., based on information from user device 210 that identifies a user of transaction card 220 and/or user device 210) and may determine a set of applets to configure based on the user of transaction card 220 (e.g., a set of applets associated with an account of the user). In this way, and continuing with the previous example, the same transaction card 220 could be used by multiple individuals, an employer could configure transaction card 220 for an employee prior to the employee leaving for a business trip, a parent could configure transaction card 220 for a child, and/or the like.

In some implementations, transaction card 220 may establish a communication with a device (e.g., user device 210 and/or transaction backend device 230) to indicate that the set of applets was configured. In some implementations, transaction card 220 may provide a notification for display to indicate that the set of applets was configured and/or to identify any errors related to configuring the set of applets. For example, the notification may be provided for display via user device 210, a display of transaction card 220, an output component of transaction card 220 and/or user device 210, and/or the like. Continuing with the previous example, the notification may include text, activation of a light, output of a sound via a speaker, and/or the like.

In this way, transaction card 220 may configure the set of applets on transaction card 220 prior to configuring the display of transaction card 220.

As further shown in FIG. 4, process 400 may include configuring an electronic paper display to display information identifying the set of applets (block 440). For example, transaction card 220 may configure an electronic paper display to display information identifying the set of applets. In some implementations, transaction card 220 may configure a display other than an electronic paper display, such as a segment display, a light-emitting diode (LED) display, a liquid crystal display (LCD), a thin-film transistor (TFT) display, and/or the like.

In some implementations, an electronic paper display may include a display that can display information when the electronic paper display is not powered. Additionally, or alternatively, an electronic paper display may not emit light, as is the case with a backlit display, but rather reflects light.

In some implementations, transaction card 220 may configure the electronic paper display to display information that identifies applets configured on transaction card 220. Additionally, or alternatively, transaction card 220 may configure the electronic paper display to display information that identifies applets not configured on transaction card 220. In some implementations, transaction card 220 may configure the electronic paper display using power induced in an NFC component of transaction card 220 (e.g., while the NFC component is within an electromagnetic field generated by another device), using power stored in a capacitor of transaction card 220 (e.g., after an NFC component of transaction card 220 has been removed from an electromagnetic field generated by another device), and/or the like. In this way, the electronic paper display needs to be powered only to modify the information displayed by the electronic paper display. This conserves power resources of transaction card 220, reduces or eliminates a need for a battery to be included in transaction card 220, and/or the like.

In some implementations, transaction card 220 may complete a transaction. For example, transaction card 220 may communicate with transaction terminal 240 to complete a transaction, such as a financial transaction, providing access to a hotel room, providing a fare to access a transit system, and/or the like.

In some implementations, transaction card 220 may power off. For example, transaction card 220 may power off after configuring the electronic paper display. Additionally, or alternatively, and as another example, transaction card 220 may power off after an NFC component of transaction card 220 is removed from the electromagnetic field. In some implementations, a display of transaction card 220 (e.g., the electronic paper display) may be configured to display information identifying the set of applets configured on transaction card 220 after transaction card 220 has powered off.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
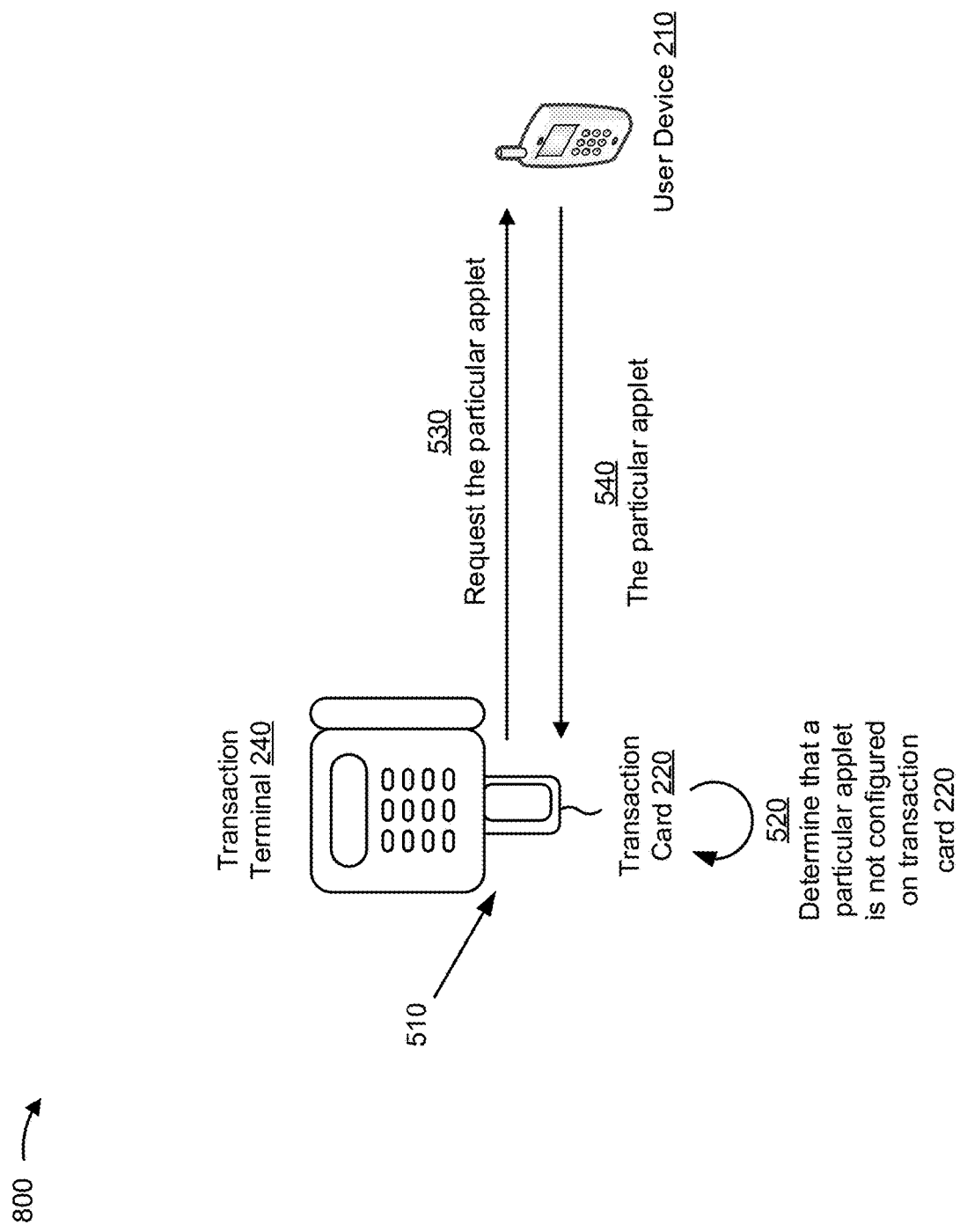
FIG. 5 is a diagram of an example implementation relating to the example process shown in FIG. 4.

FIG. 5 shows a diagram of an example implementation 500 relating to example process 400 shown in FIG. 4. FIG. 5 shows an example of transaction card 220 determining one or more applets or a set of applets to be configured on transaction card 220.

As shown in FIG. 5, and by reference number 510, transaction card 220 may be communicatively coupled with transaction terminal 240. For example, transaction card 220 may be communicatively coupled with transaction terminal 240 to complete a transaction. In some implementations, an NFC component of transaction card 220 may be within an electromagnetic field generated by transaction terminal 240 when communicatively coupled with transaction terminal 240, thereby inducing electric current in the NFC component and causing transaction card 220 to power on.

As shown by reference number 520, transaction card 220 may determine that a particular applet is not configured on transaction card 220. For example, the particular applet may be associated with completing a particular type of transaction via transaction terminal 240, a particular location, a particular user, and/or the like. In some implementations, transaction card 220 may determine that the particular applet is not configured based on information in a data structure stored by transaction card 220 that identifies applets and corresponding types of transactions, locations, and/or the like. Additionally, or alternatively, after powering on, transaction card 220 may communicate with user device 210 and/or transaction backend device 230 (e.g., via transaction terminal 240) to determine that a particular applet is not configured on transaction card 220. For example, user device 210 and/or transaction backend device 230 may store a data structure that includes information identifying a set of applets and corresponding types of transactions.

As shown by reference number 530, transaction card 220 may request the particular applet from user device 210. For example, transaction card 220 may request the particular applet via a wireless connection between transaction card 220 and user device 210 by providing information identifying the particular applet to user device 210. As shown by reference number 540, user device 210 may provide, to transaction card 220, the particular applet. For example, user device 210 may provide program code, program files, installation files, and/or the like to transaction card 220 so that transaction card 220 can install the applet.

As indicated above, FIG. 5 is provided merely as an example. Other examples are possible and may differ from what was described with regard to FIG. 5.

In this way, a battery-less transaction card 220 can be powered to run one or more applets to complete various types of transactions. This improves functionality of the transaction card by providing a reconfigurable transaction card 220 while conserving dimensional resources of transaction card 220. In addition, this reduces a cost of transaction card 220 by eliminating a need for a battery in transaction card 220. Further, this conserves power resources of transaction card 220 and facilitates better power management of power of transaction card 220.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    communicatively coupling, by a transaction card, with a device;
    receiving, by the transaction card and based on communicatively coupling with the device, one or more instructions associated with configuring one or more applets;
    configuring, by the transaction card and based on the one or more instructions, an applet associated with a particular type of transaction; and
    communicating, by the transaction card and based on configuring the applet, with the device to perform the particular type of transaction.

2. The method of claim 1, wherein the one or more instructions are received from a user device.

3. The method of claim 1, wherein the one or more instructions are received from a user device based on a user selection of the applet.

4. The method of claim 1, further comprising:
    receiving location information; and
    wherein configuring the applet comprises:
        configuring the applet based on the location information.

5. The method of claim 1, further comprising:
    configuring a display to display information identifying the applet.

6. The method of claim 1, further comprising:
    disabling another applet based on the one or more instructions.

7. The method of claim 1, further comprising:
    detecting a user associated with the transaction card; and
    wherein configuring the applet comprises:
        configuring the applet based on the user.

8. A transaction card, comprising:
    one or more memories; and
    one or more processors, coupled to the one or more memories, configured to cause the transaction card to:
        communicatively couple with a device;
        receive one or more instructions associated with configuring one or more applets;
        configure an applet associated with a particular type of transaction; and
        communicate, based on the applet being configured, with the device to perform the particular type of transaction.

9. The transaction card of claim 8, wherein the one or more processors, to receive the one or more instructions, are configured to cause the transaction card to:
    receive the one or more instructions from a user device.

10. The transaction card of claim 8, wherein the one or more processors are further configured to cause the transaction card to:
    receive location information; and
    wherein the one or more processors, to configure the applet, are configured to cause the transaction card to:
        configure the applet based on the location information.

11. The transaction card of claim 8, wherein the one or more processors, to configure the applet, are configured to cause the transaction card to:
    receive location information; and
    configure the applet based on the location information.

12. The transaction card of claim 8, wherein the one or more processors are further configured to cause the transaction card to:
  configure a display to display information that identifies the applet.

13. The transaction card of claim 8, wherein the one or more processors are further configured to cause the transaction card to:
  selectively uninstall another applet.

14. The transaction card of claim 8, wherein the one or more processors are further configured to cause the transaction card to:
  disable another applet based on the one or more instructions.

15. The transaction card of claim 8, wherein the one or more processors are further configured to cause the transaction card to:
  detect a user associated with the transaction card; and
  wherein the one or more processors, to configure the applet, are configured to cause the transaction card to:
    configure the applet based on the user.

16. A non-transitory computer-readable medium storing a set of instructions, the set of instructions comprising:
  one or more instructions that, when executed by one or more processors of a transaction card, cause the transaction card to:
    communicatively couple with a device;
    receive an instruction associated with configuring an applet associated with a particular type of transaction;
    configure the applet; and
    communicate, based on the applet being configured, with the device to perform the particular type of transaction.

17. The non-transitory computer-readable medium of claim 16, wherein the one or more instructions, that cause the transaction card to receive the instruction, cause the transaction card to:
  receive the instruction from a user device.

18. The non-transitory computer-readable medium of claim 16, wherein the one or more instructions further cause the transaction card to:
  receive location information; and
  wherein the one or more instructions, that cause the transaction card to configure the applet, cause the transaction card to:
    configure the applet based on the location information.

19. The non-transitory computer-readable medium of claim 16, wherein the one or more instructions further cause the transaction card to:
  configure a display to display information that identifies the applet.

20. The non-transitory computer-readable medium of claim 16, wherein the one or more instructions further cause the transaction card to:
  disable another applet based on the one or more instructions.

* * * * *